(12) United States Patent
Luanava et al.

(10) Patent No.: US 8,305,672 B2
(45) Date of Patent: Nov. 6, 2012

(54) MAGNETICALLY ACTUATED SYSTEM

(75) Inventors: Selso Luanava, Woodinville, WA (US); Matthew Ellis, Austin, TX (US)

(73) Assignee: Microvision, Inc., Redmond, WA (US)

( * ) Notice: Subject to any disclaimer, the term of this patent is extended or adjusted under 35 U.S.C. 154(b) by 331 days.

(21) Appl. No.: 12/710,474

(22) Filed: Feb. 23, 2010

(65) Prior Publication Data
US 2011/0205612 A1    Aug. 25, 2011

(51) Int. Cl.
*G02B 26/08* (2006.01)
(52) U.S. Cl. .................. 359/200.7; 359/224.1
(58) Field of Classification Search ............... 359/200.7, 359/223.1–226.1
See application file for complete search history.

(56) References Cited

U.S. PATENT DOCUMENTS

| | | | |
|---|---|---|---|
| 5,898,652 A | 4/1999 | Makigaki | |
| 7,265,887 B2 * | 9/2007 | Orcutt | 359/224.1 |
| 7,777,927 B2 * | 8/2010 | Mizoguchi et al. | 359/224.1 |
| 2008/0054732 A1 | 3/2008 | Ko et al. | |
| 2008/0285107 A1 | 11/2008 | Asada et al. | |
| 2009/0110388 A1 | 4/2009 | Tsujiyama | |

OTHER PUBLICATIONS

Microvision, Inc., , "PCT International Search Report and Written Opinion", PCT ISR and Written Opinion for PCT Appl. No. PCT/US2011/023473 Sep. 30, 2011.

* cited by examiner

*Primary Examiner* — Euncha Cherry
(74) *Attorney, Agent, or Firm* — Kevin D. Wills

(57) ABSTRACT

A magnetically actuated system includes a conductor and a magnetic field apparatus to generate a magnetic field. The magnetic field apparatus includes magnets and magnetically permeable materials to focus the magnetic field in areas of the conductor that produce a drive torque when the conductor carries a current.

14 Claims, 10 Drawing Sheets

MAGNETICALLY ACTUATED SYSTEM

FIELD

The present invention relates generally to magnetically actuated systems, and more specifically to magnet field generation used in magnetically actuated systems.

BACKGROUND

Magnetic actuation makes use of "Lorentz Forces" in which a force on a current-carrying conductor is related to the current in the conductor and the strength of a magnetic field across the conductor. The force exerted is perpendicular to the direction of the current in the conductor and perpendicular to the magnetic field.

In magnetically actuated systems, power efficiency can be gained by using larger magnets to create a stronger magnetic field. The larger magnets, however, are heavier and increase volume requirements of the resulting system. On the other hand, volume and weight can be reduced by increasing the current in the conductor, but this is at the expense of increased power consumption. Accordingly, one can see that a trade-off exists between power consumption and weight/volume in magnetically actuated systems.

It is desirable to reduce both power consumption and weight/volume in magnetically actuated systems.

DESCRIPTION OF EMBODIMENTS

Figure 1:
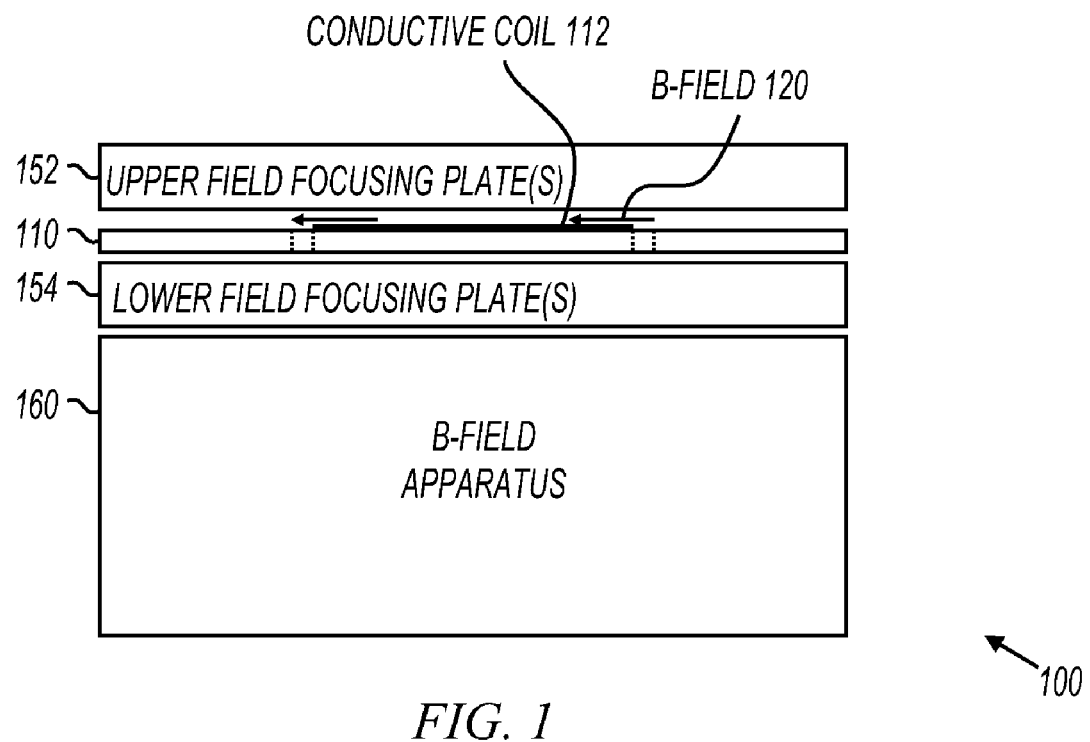
FIG. 1 shows a cross-section of a magnetically actuated system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a cross-section of a magnetically actuated system in accordance with various embodiments of the present invention. Magnetically actuated system 100 includes magnetic field (B-field) apparatus 160, magnetically actuated device 110, upper field focusing plate(s) 152, and lower field focusing plate(s) 154. Magnetically actuated device 110 includes a conductive coil seen in cross-section at 112. The B-field apparatus 160 produces a magnetic field across conductive coil 112. The B-field is shown by arrows 120.

In some embodiments, B-field apparatus 160 includes multiple magnets having various orientations. These magnets work together to "focus" B-field 120 into an area of the conductive coil where the resulting force will have the greatest effect. In other embodiments, B-field apparatus 160 includes multiple magnets and a magnetically permeable core to aid in focusing the resulting B-field.

Upper and lower field focusing plates 152, 154 include magnetically permeable materials. The magnetically permeable materials are positioned to further focus the B-field in areas of the conductive coil 112. The various embodiments of the present invention combine different permutations of magnets and magnetically permeable materials to focus the B-field in areas of the conductive coil where greater Lorentz forces are desired. These permutations are shown in, and described below with reference to, FIGS. 3-13.

Figure 2:
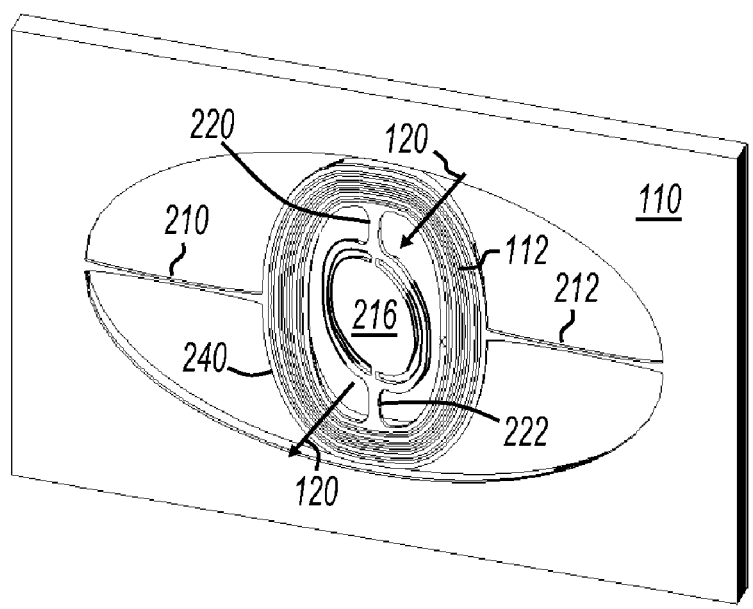
FIG. 2 shows a perspective view of a magnetically actuated device having a movable platform with a conductive coil.

FIG. 2 shows a perspective view of a magnetically actuated device having a movable platform with a conductive coil. Device 110 includes movable platform 240 and mirror 216. In embodiments represented by FIG. 2, movable platform 240 is a gimbaled structure coupled to the frame of device 110 by flexures 210 and 212, and mirror 216 is coupled to movable platform 240 by flexures 220 and 222. Movable platform 240 has a conductive coil 112 capable of carrying current. In some embodiments, flexures 210 and/or 212 include conductors to carry current to and from conductive coil 112.

Flexures 210 and 212 allow movable platform 240 to move in one angular dimension (also referred to as a "drive axis"). Likewise, flexures 220 and 222 allow mirror 216 to move on a second drive axis. In embodiments represented by FIG. 2, the two drive axes are 90 degrees apart, but this is not a limitation of the present invention.

In operation, various B-field apparatuses impose and focus a magnetic field 120 on conductive coil 112. The magnetic field imposed on the conductive coil has a component in the plane of the coil, and is oriented at roughly 45° with respect to the two drive axes. The in-plane current in the coil windings interacts with the in-plane magnetic field to produce out-of-plane Lorentz forces on the conductors. Since the drive current forms a loop on movable platform 240, the current reverses sign across the drive axes. This means the Lorentz forces also reverse sign across the drive axes, resulting in a torque in the plane of and normal to the magnetic field. This combined torque produces responses in the two scan directions depending on the frequency content of the torque.

In embodiments represented by FIG. 2, one magnetic field is used to produce angular movement of the mirror on both drive axes. In order to cause movement of platform 240, the B-field 120 has a component perpendicular to, and in the plane of, the conductive coil 112. Furthermore, required drive power can be reduced if the intensity of these in-plane perpendicular B-field vector components is increased. The drive torque is related to the product of the normal component of the magnetic B field and the coil drive current. Thus, a 10% increase in B field will allow a 10% decrease in current. Because the power required to drive the coil current is related to the square of the current, a 10% increase in B field will result in a 21% decrease in drive power.

The various embodiments of the present invention are described relative to the magnetically actuated device shown in FIG. 2. For example, as shown in FIG. 2, the conductive coil is elliptical and on a gimballed movable platform with a mirror having drive axes at substantially 90 degrees to the drive axes of the movable platform. The various embodiments of the invention may be utilized with any magnetically actuated device and are not limited to the device as shown in FIG. 2. For example, magnet assemblies and magnetically actuated systems described below can be utilized to provide a Lorentz force on any conductor having any shape on any movable platform.

Figure 3:
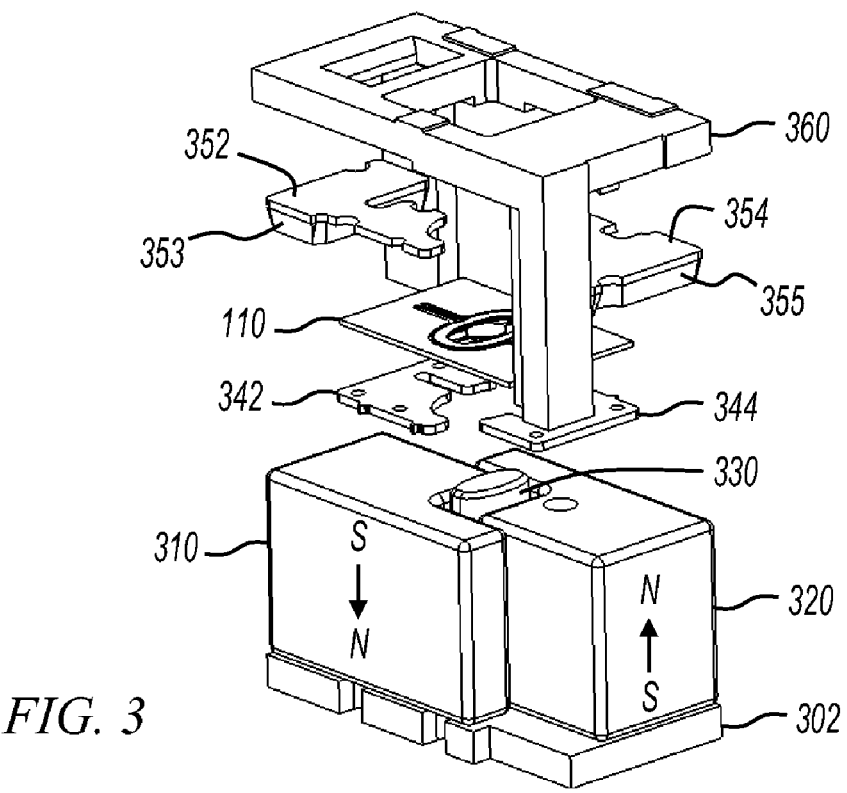
FIGS. 3-4 show exploded views of a magnetically actuated system with multiple field focusing plates.

FIG. 3 shows an exploded view of a magnetically actuated system with multiple field focusing plates. Magnetically actuated system 300 includes bottom plate 302, magnets 310 and 320, magnetically permeable core 330, lower field focusing plates 342 and 344, magnetically actuated device 110, upper field focusing plates 352 and 354, and die carrier 360.

When system 300 is assembled, magnetically actuated device 110 is nominally situated above magnets 310, 320 and lower field focusing plates 342, 344, and below upper field focusing plates 352, 354. The conductive coil on device 110 is said to be nominally in a "platform plane." When the conductive coil is at rest, it is in the platform plane, and when it is moving, it may have an angular displacement relative to the platform plane. This terminology has been selected to refer to the plane in which the coil resides, and is not meant to imply any further structural limitations. Further, various embodiments are described using terms such as "above," "below," "up," "down," etc. These terms have been selected to allow the description of relative placement and orientation of components and are not meant to imply any absolute orientation.

Bottom plate 302, magnets 310, 320, and magnetically permeable core 330 form a B-field apparatus such as B-field apparatus 160 (FIG. 1). Magnets 310 and 320 are permanent magnets situated beneath the conductive coil on device 110, and have various magnetic orientations. For example, magnet 310 has a north pole facing down and a south pole facing up, and magnet 320 is oriented parallel to magnet 310 with a north pole facing up and a south pole facing down. Magnets 310 and 320 are shown oriented perpendicular to the platform plane.

In some embodiments, magnets 310 and 320 are oriented such that they produce a magnetic field that is misaligned with respect to the drive axes of device 110. For example, as shown in FIG. 3, the conductive coil on device 110 is elliptical in shape with the two drive axes on the major and minor ellipse axes. Magnets 310 and 320, however, are oriented such that the resulting magnetic field does not align with either of the drive axes. By intentionally misaligning magnets 310 and 320 with respect to the drive axes, the generated B-field can be positioned to cross the conductive coil at a point in the ellipse where drive torque is needed. See B-field 120 in FIG. 2.

Magnets 310 and 320 are shown generally having an "L" shape, but this is not a limitation of the present invention. In some embodiments, magnets 310 and 320 are triangular, and in other embodiments, magnets 310 and 320 are rectangular. Magnets 310 and 320 are shown mounted to base plate 302. In some embodiments, base plate 302 is made of a magnetically permeable material to aid in "closing" the magnetic circuit, although this is not a limitation of the present invention.

Core 330 is made from a magnetically permeable material such as steel. Core 330 is positioned between magnets 310 and 320 beneath the conductive coil. The conductive coil on device 110 has an inner outline and an outer outline when viewed from above. In some embodiments, when viewed from above, core 330 is entirely within the inner outline of the conductive coil.

Core 330 provides a lower reluctance path for the magnetic field, so the magnetic field passing through the conductive coil tends to enter and exit core 330 (and the inner outline of the coil) at closer to 90 degrees. This provides more drive torque for a given magnetic field strength.

Die carrier 360 is used to house the various components shown in FIG. 3. For example, device 110 may mechanically and/or electrically connect to die carrier 360. Further, the various field focusing plates shown in FIG. 3 may be held in place by die carrier 360. Die carrier 360 is shown with an aperture above the movable platform of device 110. This aperture allows light to enter and be reflected by the mirror.

Figure 4:
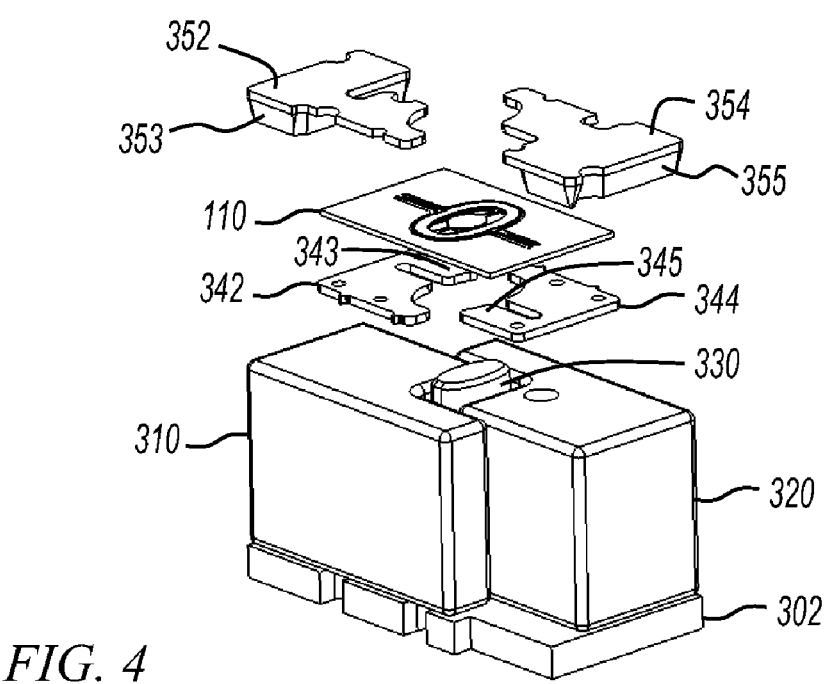

FIG. 4 shows the same magnetically actuated system as FIG. 3, but without the die carrier 360. As can be more clearly seen in FIG. 4, the different field focusing plates may have various shapes. In some embodiments, the field focusing plates are placed outside the outer outline of the conductive coil. Field focusing plates 342, 344, 352, and 354 are made from a magnetically permeable material that provides a low reluctance path for the magnetic field. Through strategic shaping and placement of the field focusing plates, the magnetic field produced by magnets 310 and 320 can be "steered" to areas of the conductive coil where high magnetic field strength is desired.

In embodiments represented by FIG. 4, upper field focusing plates 352, 354 have stepped portions 353, 355. When assembled, the stepped portions of the upper field focusing plates provide a low reluctance path for the magnetic field. This encourages the magnetic field to travel through the upper field focusing plates substantially parallel to the platform plane. Also in embodiments represented by FIG. 4, the lower field focusing plates are substantially flat and are entirely beneath the platform plane. The combination of the stepped upper field focusing plates and the substantially flat lower field focusing plates encourage the magnetic field to travel substantially parallel to the conductive coil. The upper and lower field focusing plates are further shaped to provide a low reluctance path for the magnetic field near areas of the coil where high magnetic field strength is desired.

One problem that exists in magnetics is even if you can get the field in the location you want it in, it is very difficult to control the "orientation" of the B-field because it wants to "spray" out of the permeable material. The field focusing plates have various protruding legs to control the "spray" of magnetic field as it leaves the permeable material. For example, lower field focusing plates 342, 344 include legs 343, 345. In some embodiments, all of the field focusing plates include one or more protruding legs. The leg(s) help contain the spray out and size and shape changes in the leg(s) provide a level of control over the B-field that affects relative angles between the B-field and the conductive coil.

Figure 5:
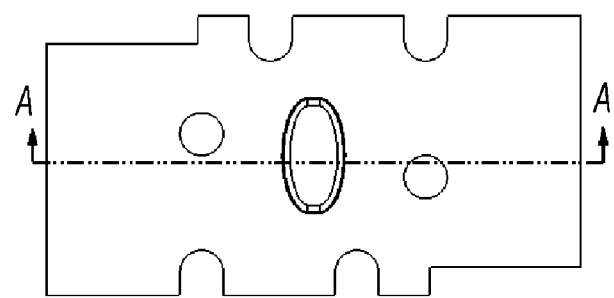
FIGS. 5-8 show plan views and sectional views of the magnetically actuated system of FIGS. 3-4.
Figure 5:
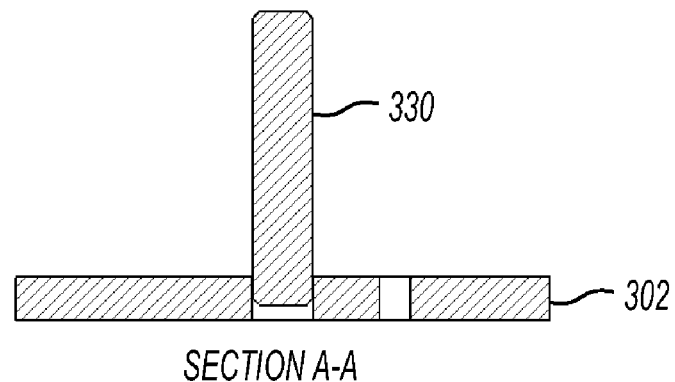
Figure 6:
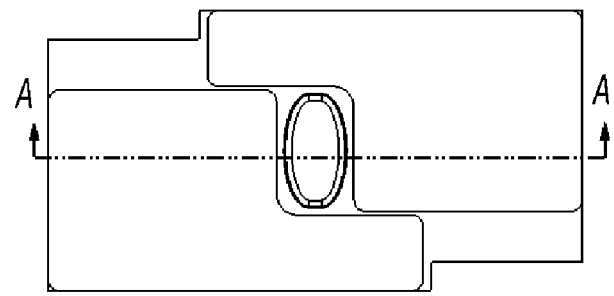
Figure 6:
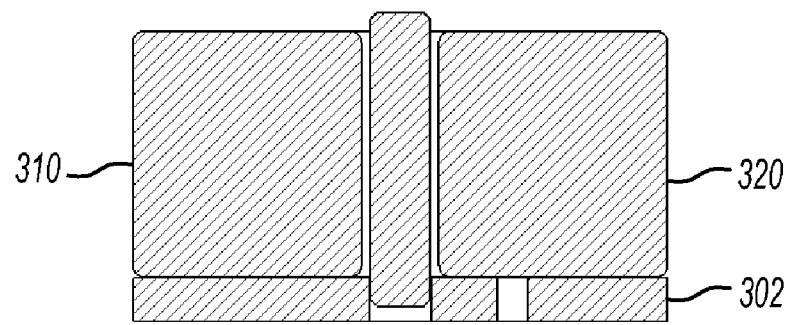

FIGS. 5-8 show plan views and sectional views of the magnetically actuated system of FIGS. 3-4. FIG. 5 shows a plan view and sectional view of base plate 302 and magnetically permeable core 330. FIG. 6 shows a plan view and sectional view of base plate 302, core 330, and magnets 310 and 320.

Figure 7:
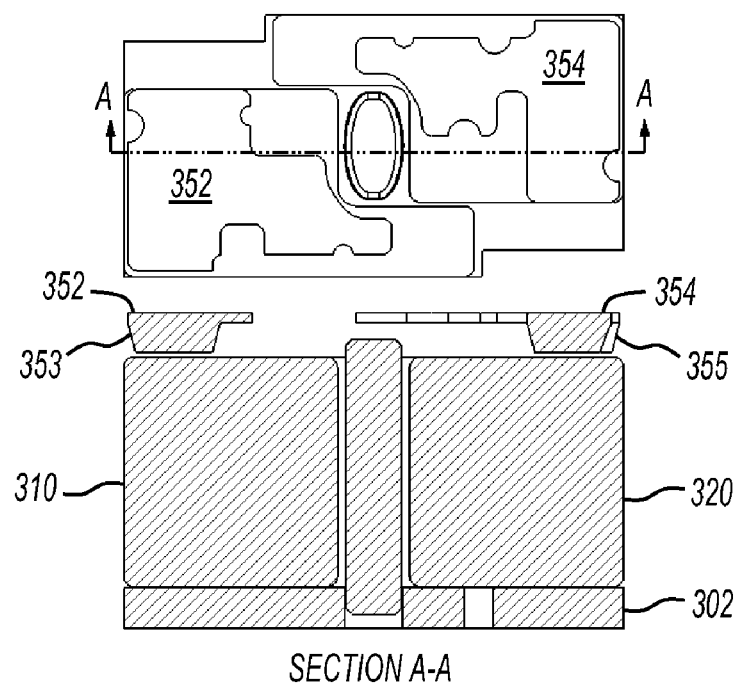

FIG. 7 shows a plan view and sectional view that includes upper field focusing plates 352 and 354. As shown in FIG. 7, upper field focusing plates 352 and 354 are nominally positioned above the platform plane; however, the stepped portions 353 and 355 of the upper field focusing plates occupy some space in the platform plane, and extend to very near magnets 310 and 320. The low reluctance of the upper field focusing plates 352 and 354 helps steer the magnetic field from magnets 310 and 320 up through stepped portions 353 and 355 and through the horizontal portion of the plates above the platform plane.

Upper field focusing plates 352 and 354 may have any shape. As shown in FIG. 7, in some embodiments, the stepped portions are at the outer extremes, and the horizontal portions extend to near the areas where the magnetic field is desired. Some embodiments vary the shape of the upper field focusing plates, and other embodiments vary the thickness of the upper field focusing plates. In some embodiments, more or less than two upper field focusing plates are included. For example, in some embodiments, one upper field focusing plate is included. Also for example, in some embodiments, three or more upper field focusing plates are included. Further, in some embodiments, upper field focusing plates 352 and 354 are omitted. These embodiments eliminate the volume and weight associated with the upper field focusing plates.

Figure 8:
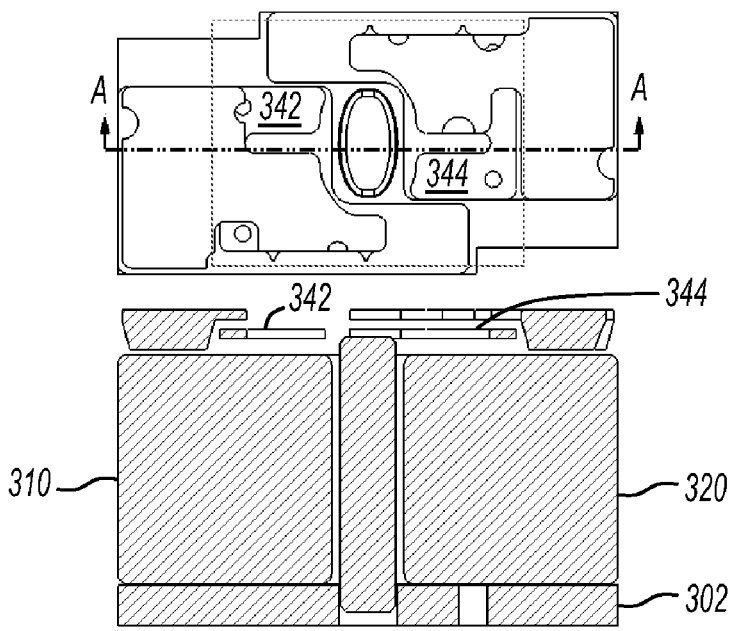

FIG. 8 shows a plan view and sectional view that includes lower field focusing plates 342 and 344. As shown in FIG. 8, lower field focusing plates 342 and 344 are nominally positioned above magnets 310 and 320, and below the platform plane. The low reluctance of the lower field focusing plates 342 and 344 helps steer the magnetic field from magnets 310 and 320 horizontally through the magnetically permeable material. In some embodiments, more or less than two lower field focusing plates are included. For example, in some embodiments, one lower field focusing plate is included. Also for example, in some embodiments, three or more lower field focusing plates are included. Further, in some embodiments, lower field focusing plates 342 and 344 are omitted. These embodiments eliminate the volume and weight associated with the lower field focusing plates.

Figure 9:
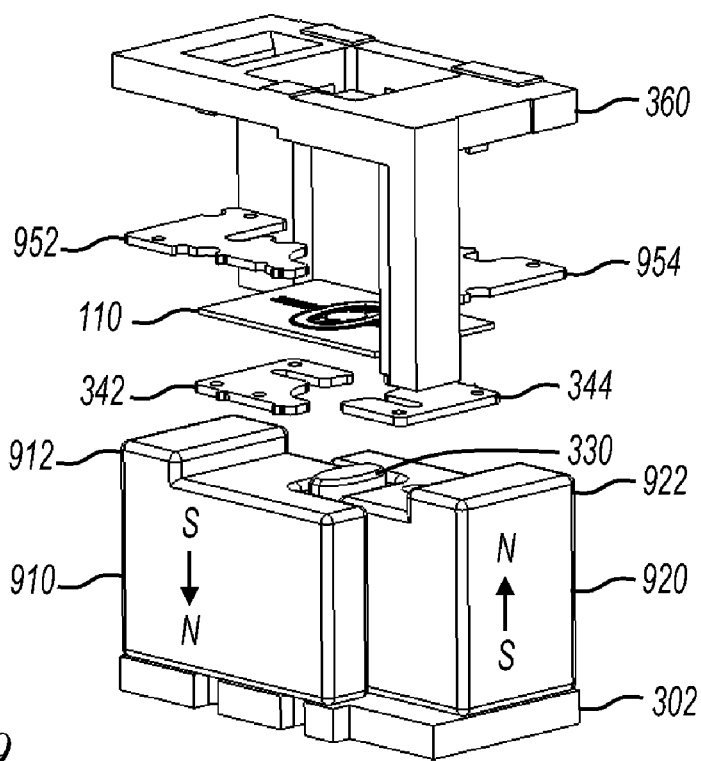
FIGS. 9-10 show exploded views of a magnetically actuated system with multiple field focusing plates.

FIG. 9 shows an exploded view of a magnetically actuated system with multiple field focusing plates. Magnetically actuated system 900 includes bottom plate 302, magnets 910 and 920, magnetically permeable core 330, lower field focusing plates 342 and 344, magnetically actuated device 110, upper field focusing plates 952 and 954, and die carrier 360.

When system 900 is assembled, magnetically actuated device 110 is nominally situated above magnets 910, 920 and lower field focusing plates 342, 344, and below upper field focusing plates 952, 954. The conductive coil on device 110 is said to be nominally in a "platform plane." When the conductive coil is at rest, it is in the platform plane, and when it is moving, it may have an angular displacement relative to the platform plane. This terminology has been selected to refer to the plane in which the coil resides, and is not meant to imply any further structural limitations. Further, various embodiments are described using terms such as "above," "below," "up," "down," etc. These terms have been selected to allow the description of relative placement and orientation of components and are not meant to imply any absolute orientation.

Bottom plate 302, magnets 910, 920, and magnetically permeable core 330 form a B-field apparatus such as B-field apparatus 160 (FIG. 1). Magnets 910 and 920 are permanent magnets that have various magnetic orientations. For example, magnet 910 has a north pole facing down and a south pole facing up, and magnet 920 is oriented parallel to magnet 910 with a north pole facing up and a south pole facing down. Magnets 910 and 920 are shown oriented perpendicular to the platform plane.

In some embodiments, magnets 910 and 920 are oriented such that they produce a magnetic field that is misaligned with respect to the drive axes of device 110. For example, as shown in FIG. 9, the conductive coil on device 110 is elliptical in shape with the two drive axes on the major and minor ellipse axes. Magnets 910 and 920, however, are oriented such that the resulting magnetic field does not align with either of the drive axes. By intentionally misaligning magnets 910 and 920 with respect to the drive axes, the generated B-field can be positioned to cross the conductive coil at a point in the ellipse where drive torque is needed. See B-field 120 in FIG. 2.

Magnets 910 and 920 are shown generally having an "L" shape, but this is not a limitation of the present invention. In some embodiments, magnets 910 and 920 are triangular, and in other embodiments, magnets 910 and 920 are rectangular. Magnets 910 and 920 are shown mounted to base plate 302. In some embodiments, base plate 302 is made of a magnetically permeable material to aid in "closing" the magnetic circuit, although this is not a limitation of the present invention.

Magnets 910 and 920 include stepped portions 912 and 922. The stepped portions form a recessed area within which the lower field focusing plates and device 110 reside. The stepped portions are shown as rectangular, however this is not a limitations of the present invention. For example, the stepped portions of the magnets may be any shape and may be placed anywhere on magnets 910 and 920.

Core 330 is made from a magnetically permeable material such as steel. Core 330 is positioned between magnets 910 and 920 beneath the conductive coil. The conductive coil on device 110 has an inner outline and an outer outline when viewed from above. In some embodiments, when viewed from above, core 330 is entirely within the inner outline of the conductive coil.

Core 330 provides a lower reluctance path for the magnetic field, so the magnetic field passing through the conductive coil tends to enter and exit core 330 (and the inner outline of the coil) at closer to 90 degrees. This provides more drive torque for a given magnetic field strength.

Die carrier 360 is used to house the various components shown in FIG. 9. For example, device 110 may mechanically and/or electrically connect to die carrier 360. Further, the various field focusing plates shown in FIG. 9 may be held in place by die carrier 360. Die carrier 360 is shown with an aperture above the movable platform of device 110. This aperture allows light to enter and be reflected by the mirror.

Figure 10:
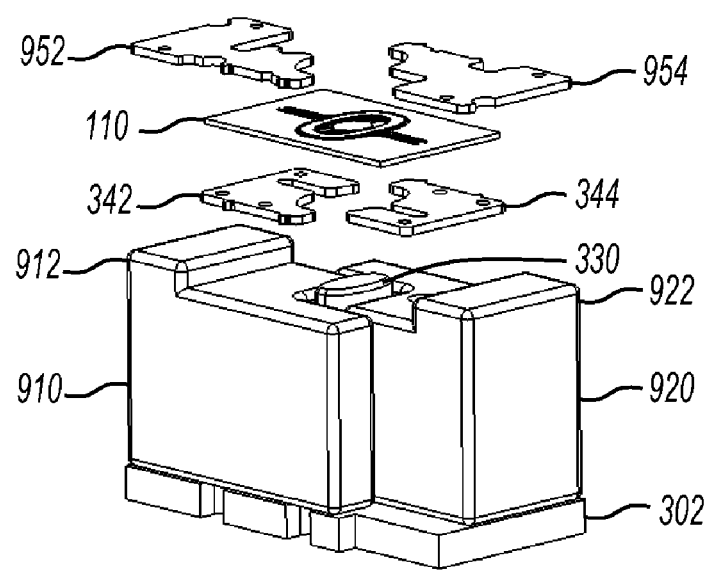

FIG. 10 shows the same magnetically actuated system as FIG. 9, but without the die carrier 360. As can be more clearly seen in FIG. 10, the different field focusing plates may have various shapes. In some embodiments, the field focusing plates are placed outside the outer outline of the conductive coil. Field focusing plates 342, 344, 952, and 954 are made from a magnetically permeable material that provides a low reluctance path for the magnetic field. Through strategic shaping and placement of the field focusing plates, the magnetic field produced by magnets 910 and 920 can be "steered" to areas of the conductive coil where high magnetic field strength is desired.

In embodiments represented by FIG. 10, upper field focusing plates 952, 954 contact or very nearly contact the stepped portions of magnets 910 and 920. When assembled, the upper field focusing plates provide a low reluctance path for the magnetic field. This encourages the magnetic field to travel through the upper field focusing plates substantially parallel to the platform plane. Also in embodiments represented by FIG. 10, the lower field focusing plates are substantially flat and are entirely beneath the platform plane. The combination of the stepped magnets, the upper field focusing plates, and the lower field focusing plates encourages the magnetic field to travel substantially parallel to the conductive coil. The upper and lower field focusing plates are further shaped to provide a low reluctance path for the magnetic field near areas of the coil where high magnetic field strength is desired.

Figure 11:
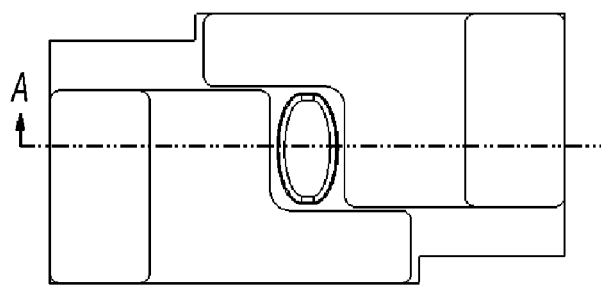
FIGS. 11-13 show plan views and sectional views of the magnetically actuated system of FIGS. 9-10.
Figure 11:
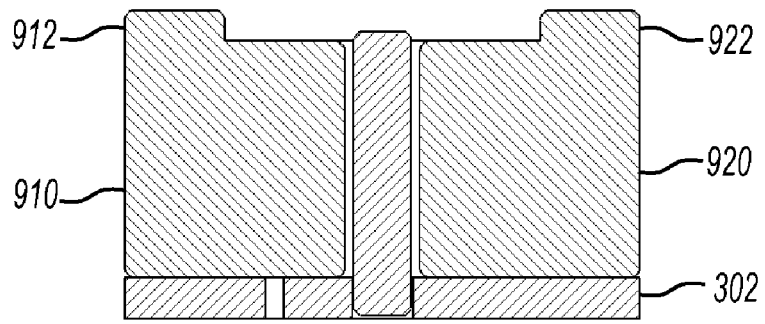
Figure 12:
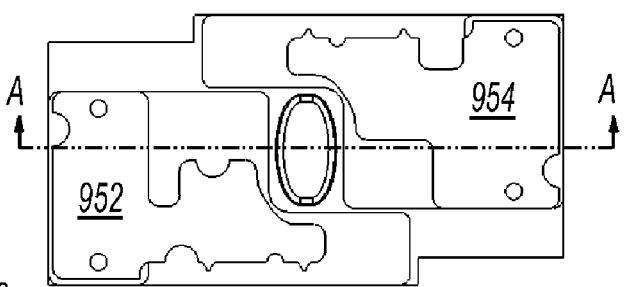
Figure 12:
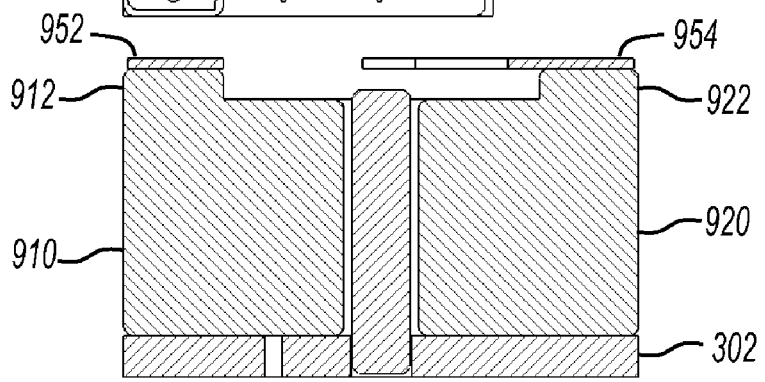
Figure 13:
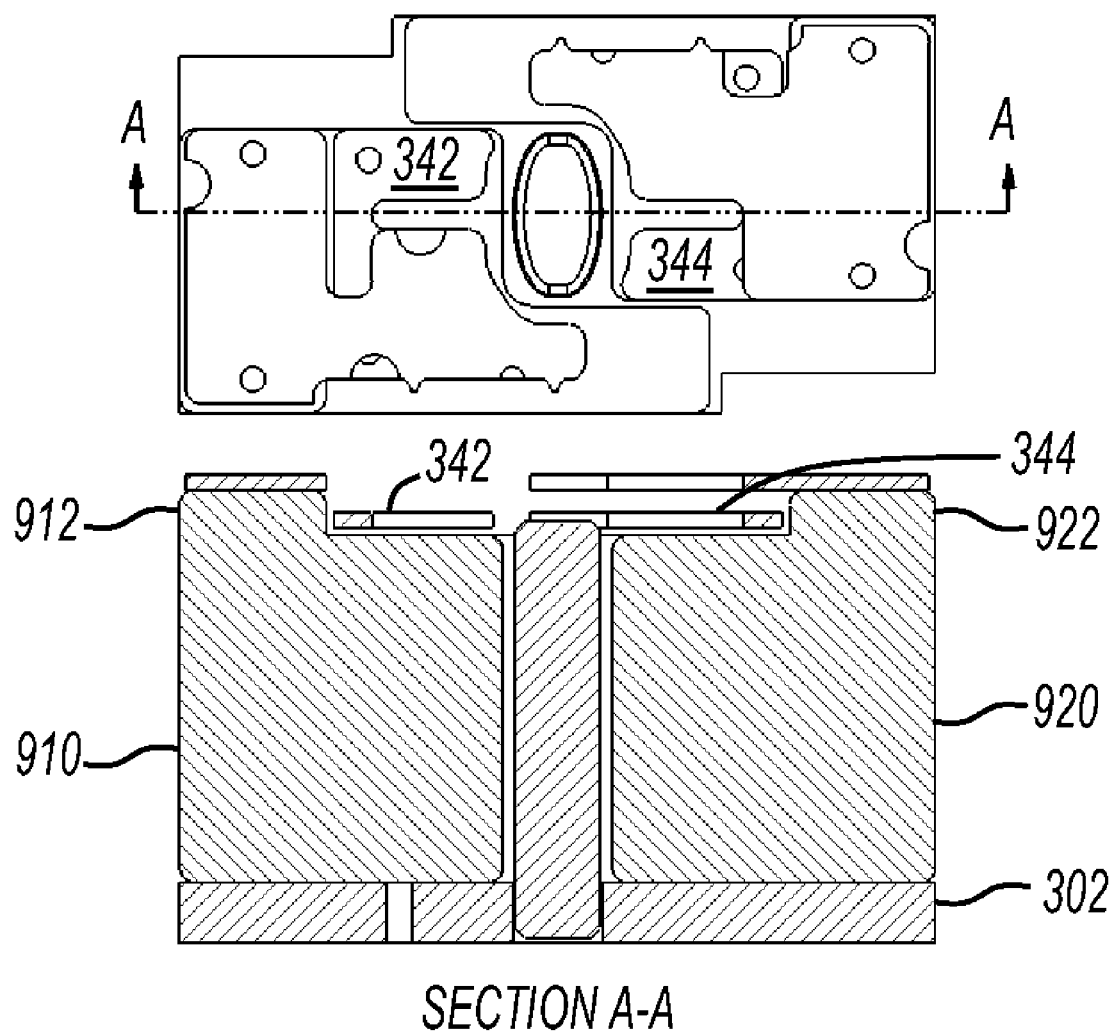

FIGS. 11-13 show plan views and sectional views of the magnetically actuated system of FIGS. 9-10. FIG. 11 shows a plan view and sectional view of base plate 302, magnetically permeable core 330, and magnets 910 and 920.

FIG. 12 shows a plan view and sectional view that includes upper field focusing plates 952 and 954. As shown in FIG. 12, magnets 910 and 920 are nominally positioned below the platform plane; however, the stepped portions 912 and 922 of magnets 910 and 920 occupy some space in the platform plane, and extend to very near the upper field focusing plates. The low reluctance of the upper field focusing plates 952 and 954 helps steer the magnetic field from magnets 910 and 920 from stepped portions 912 and 922 through the horizontal portion of the plates above the platform plane.

Upper field focusing plates 952 and 954 may have any shape. As shown in FIG. 12, in some embodiments, the upper field focusing plates contact the stepped portions 912 and 922 at the outer extremes and extend to near the areas where the magnetic field is desired. Some embodiments vary the shape of the upper field focusing plates, and other embodiments vary the thickness of the upper field focusing plates. In some embodiments, more or less than two upper field focusing plates are included. For example, in some embodiments, one upper field focusing plate is included. Also for example, in some embodiments, three or more upper field focusing plates are included. Further, in some embodiments, upper field focusing plates 952 and 954 are omitted. These embodiments eliminate the volume and weight associated with the upper field focusing plates.

FIG. 13 shows a plan view and sectional view that includes lower field focusing plates 342 and 344. As shown in FIG. 13, lower field focusing plates 342 and 344 are nominally positioned above magnets 910 and 920, and below the platform plane. The low reluctance of the lower field focusing plates 342 and 344 helps steer the magnetic field from magnets 910 and 920 horizontally through the magnetically permeable material. In some embodiments, more or less than two lower field focusing plates are included. For example, in some embodiments, one lower field focusing plate is included. Also for example, in some embodiments, three or more lower field focusing plates are included. Further, in some embodiments, lower field focusing plates 342 and 344 are omitted. These embodiments eliminate the volume and weight associated with the lower field focusing plates.

Figure 14:
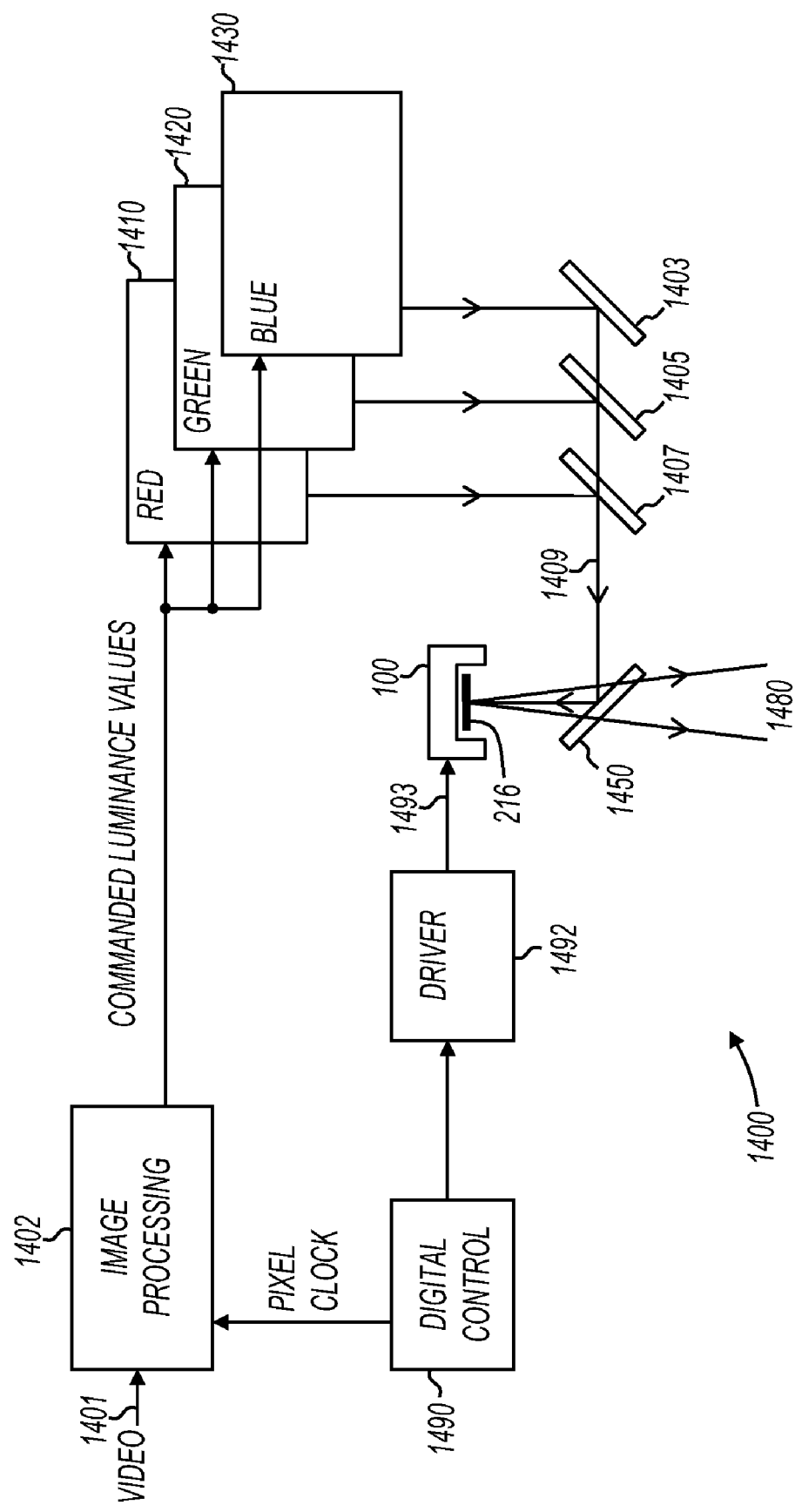
FIG. 14 shows a color laser projector.

FIG. 14 shows a color laser projection apparatus. System 1400 includes image processing component 1402, laser light sources 1410, 1420, and 1430. Projection system 1400 also includes mirrors 1403, 1405, and 1407, fold mirror 1450, magnetically actuated system 100, mirror 216, driver 1492, and digital control component 1490.

In operation, image processing component 1402 receives video data on node 1401, receives a pixel clock from digital control component 1490, and produces commanded luminance values to drive the laser light sources when pixels are to be displayed. Image processing component 1402 may include any suitable hardware and/or software useful to produce color luminance values from video data. For example, image processing component 1402 may include application specific integrated circuits (ASICs), one or more processors, or the like.

Laser light sources 1410, 1420, and 1430 receive commanded luminance values and produce light. Each light source produces a narrow beam of light which is directed to mirror 216 via guiding optics. For example, blue laser light source 1430 produces blue light which is reflected off mirror 1403 and is passed through mirrors 1405 and 1407; green laser light source 1420 produces green light which is reflected off mirror 1405 and is passed through mirror 1407; and red laser light source 1410 produces red light which is reflected off mirror 1407. At 1409, the red, green, and blue light are combined. The combined laser light is reflected off fold mirror 1450 on its way to mirror 216. After reflecting off mirror 216, the laser light bypasses fold mirror 1450 to sweep a raster pattern and create an image at 1480.

In some embodiments, mirror 216 rotates on two axes in response to electrical stimuli received on node 1493 from driver 1492. For example, mirror 216 (FIG. 2) rotates on two axes in response to the interaction between current in conductive coil 112 and B-field 120.

Magnetically actuated system 100 may be any of the embodiments described herein. For example, system 100 may include any of the systems described with reference to FIGS. 3-13. Projector 1400 is described as an example application, and the various embodiments of the invention are not so limited. For example, the compact magnet assemblies described herein may be used with other mechanically actuated systems without departing from the scope of the present invention.

Figure 15:
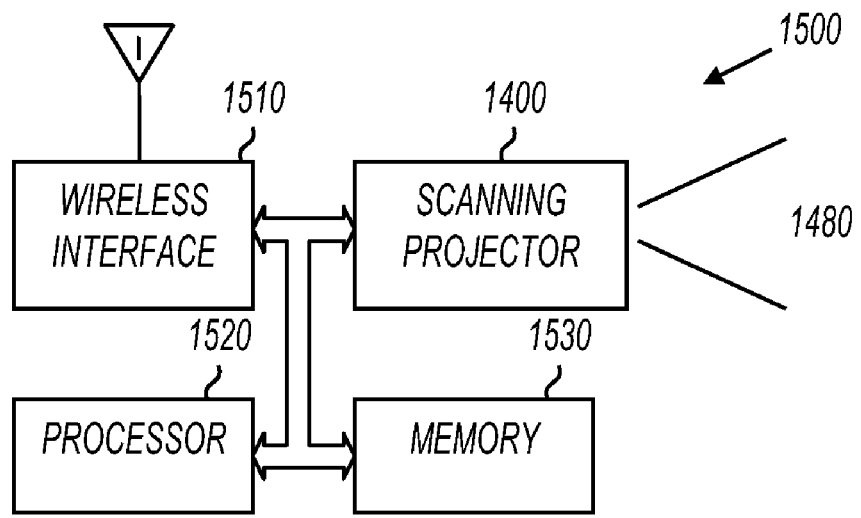
FIG. 15 shows a block diagram of a mobile device in accordance with various embodiments of the present invention.

FIG. 15 shows a block diagram of a mobile device in accordance with various embodiments of the present invention. As shown in FIG. 15, mobile device 1500 includes wireless interface 1510, processor 1520, memory 1530, and scanning projector 1400. Scanning projector 1400 paints a raster image at 1480. Scanning projector 1400 is described with reference to FIG. 14. In some embodiments, scanning projector 1400 includes a wavelength combining apparatus such as those shown in, and described with reference to, earlier figures. Scanning projector 1400 may receive image data from any image source.

For example, in some embodiments, scanning projector 1400 includes memory that holds still images. In other embodiments, scanning projector 1400 includes memory that includes video images. In still further embodiments, scanning projector 1400 displays imagery received from external sources such as connectors, wireless interface 1510, or the like.

Wireless interface 1510 may include any wireless transmission and/or reception capabilities. For example, in some embodiments, wireless interface 1510 includes a network interface card (NIC) capable of communicating over a wireless network. Also for example, in some embodiments, wireless interface 1510 may include cellular telephone capabilities. In still further embodiments, wireless interface 1510 may include a global positioning system (GPS) receiver. One skilled in the art will understand that wireless interface 1510 may include any type of wireless communications capability without departing from the scope of the present invention.

Processor 1520 may be any type of processor capable of communicating with the various components in mobile device 1500. For example, processor 1520 may be an embedded processor available from application specific integrated circuit (ASIC) vendors, or may be a commercially available microprocessor. In some embodiments, processor 1520 provides image or video data to scanning projector 1400. The image or video data may be retrieved from wireless interface 1510 or may be derived from data retrieved from wireless interface 1510. For example, through processor 1520, scanning projector 1400 may display images or video received directly from wireless interface 1510. Also for example, processor 1520 may provide overlays to add to images and/or video received from wireless interface 1510, or may alter stored imagery based on data received from wireless interface 1510 (e.g., modifying a map display in GPS embodiments in which wireless interface 1510 provides location coordinates).

Figure 16:
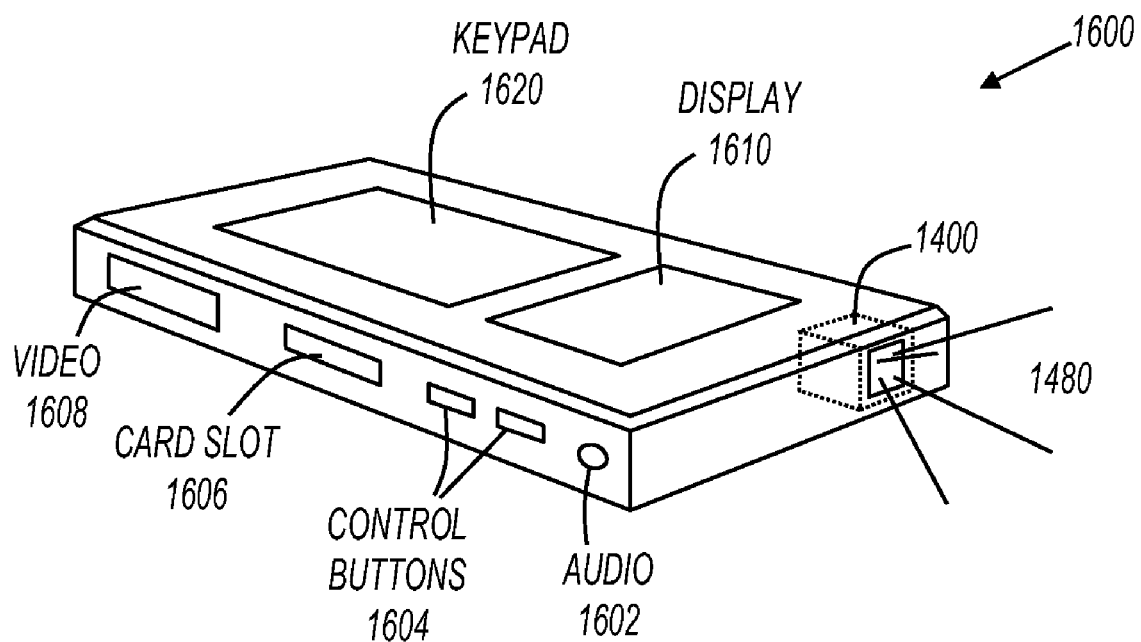
FIG. 16 shows a mobile device in accordance with various embodiments of the present invention.

FIG. 16 shows a mobile device in accordance with various embodiments of the present invention. Mobile device 1600 may be a hand held projection device with or without communications ability. For example, in some embodiments, mobile device 1600 may be a handheld projector with little or no other capabilities. Also for example, in some embodiments, mobile device 1600 may be a device usable for communications, including for example, a cellular phone, a smart phone, a personal digital assistant (PDA), a global positioning system (GPS) receiver, or the like. Further, mobile device 1600 may be connected to a larger network via a wireless (e.g., WiMax) or cellular connection, or this device can accept data messages or video content via an unregulated spectrum (e.g., WiFi) connection.

Mobile device 1600 includes scanning projector 1400 to create an image with light at 1480. Mobile device 1600 also includes many other types of circuitry; however, they are intentionally omitted from FIG. 16 for clarity.

Mobile device 1600 includes display 1610, keypad 1620, audio port 1602, control buttons 1604, card slot 1606, and audio/video (A/V) port 1608. None of these elements are essential. For example, mobile device 1600 may only include scanning projector 1400 without any of display 1610, keypad 1620, audio port 1602, control buttons 1604, card slot 1606, or A/V port 1608. Some embodiments include a subset of these elements. For example, an accessory projector product may include scanning projector 1400, control buttons 1604 and A/V port 1608.

Display 1610 may be any type of display. For example, in some embodiments, display 1610 includes a liquid crystal display (LCD) screen. Display 1610 may always display the same content projected at 1480 or different content. For example, an accessory projector product may always display the same content, whereas a mobile phone embodiment may project one type of content at 1480 while display different content on display 1610. Keypad 1620 may be a phone keypad or any other type of keypad.

A/V port 1608 accepts and/or transmits video and/or audio signals. For example, A/V port 1608 may be a digital port that accepts a cable suitable to carry digital audio and video data. Further, A/V port 1608 may include RCA jacks to accept composite inputs. Still further, A/V port 1608 may include a VGA connector to accept analog video signals. In some embodiments, mobile device 1600 may be tethered to an external signal source through A/V port 1608, and mobile device 1600 may project content accepted through A/V port 1608. In other embodiments, mobile device 1600 may be an originator of content, and A/V port 1608 is used to transmit content to a different device.

Audio port 1602 provides audio signals. For example, in some embodiments, mobile device 1600 is a media player that can store and play audio and video. In these embodiments, the video may be projected at 1480 and the audio may be output at audio port 1602. In other embodiments, mobile device 1600 may be an accessory projector that receives audio and video at A/V port 1608. In these embodiments, mobile device 1600 may project the video content at 1480, and output the audio content at audio port 1602.

Mobile device 1600 also includes card slot 1606. In some embodiments, a memory card inserted in card slot 1606 may provide a source for audio to be output at audio port 1602 and/or video data to be projected at 1480. Card slot 1606 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 17:
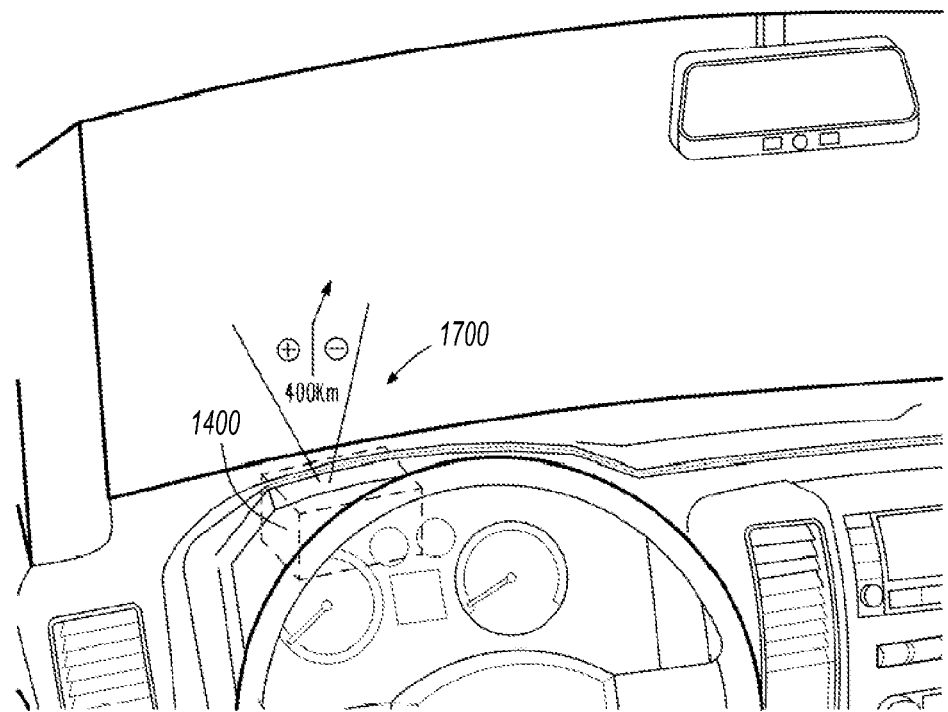
FIG. 17 shows a head-up display system in accordance with various embodiments of the invention.

FIG. 17 shows a head-up display system in accordance with various embodiments of the invention. Projector 1400 is shown mounted in a vehicle dash to project the head-up display at 1700. Although an automotive head-up display is shown in FIG. 17, this is not a limitation of the present invention. For example, various embodiments of the invention include head-up displays in avionics application, air traffic control applications, and other applications.

Figure 18:
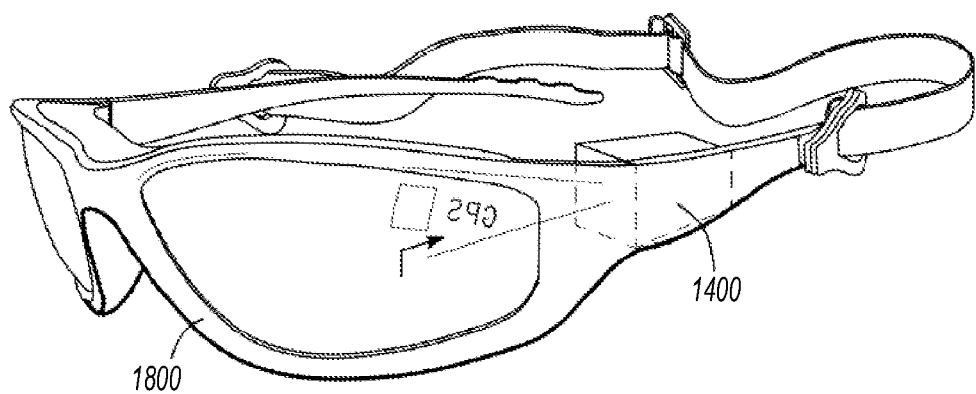
FIG. 18 shows eyewear in accordance with various embodiments of the invention.

FIG. 18 shows eyewear in accordance with various embodiments of the invention. Eyewear 1800 includes projector 1400 to project a display in the eyewear's field of view. In some embodiments, eyewear 1800 is see-through and in other embodiments, eyewear 1800 is opaque. For example, eyewear may be used in an augmented reality application in which a wearer can see the display from projector 1400 overlaid on the physical world. Also for example, eyewear may be used in a virtual reality application, in which a wearer's entire view is generated by projector 1400. Although only one projector 1400 is shown in FIG. 18, this is not a limitation of the present invention. For example, in some embodiments, eyewear 1800 includes two projectors; one for each eye.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
    a first magnet oriented with a south pole facing down and a north pole facing up;
    a second magnet oriented parallel to the first magnet, the second magnet having a north pole facing down and a south pole facing up;
    a movable platform having a conductive coil nominally oriented in a platform plane above the first and second magnets; and
    at least one upper field focusing plate of magnetically permeable material at least partially above the platform plane, wherein the at least one upper field focusing plate includes a stepped portion that at least partially occupies space in the platform plane.

2. The apparatus of claim 1 further comprising a magnetically permeable core beneath the movable platform and between the first and second magnets.

3. The apparatus of claim 2 wherein the conductive coil has an inner outline and the magnetically permeable core is oriented beneath, and within the inner outline of, the conductive coil.

4. The apparatus of claim 3 wherein the inner outline of the conductive coil is elliptical.

5. The apparatus of claim 1 wherein the movable platform includes a gimballed structure allowing a portion of the movable platform to rotate out of the platform plane on two separate axes substantially 90 degrees apart.

6. The apparatus of claim 1 further comprising at least one lower field focusing plate of magnetically permeable material below the platform plane.

7. The apparatus of claim 6 wherein the at least one lower field focusing plate includes at least one protruding leg to affect a relative angle between a magnetic field and the conductive coil.

8. The apparatus of claim 1 wherein the at least one upper focusing plate includes at least one protruding leg to affect a relative angle between a magnetic field and the conductive coil.

9. An apparatus comprising:
- a first magnet oriented with a south pole facing down and a north pole facing up, the first magnet having a first stepped portion facing up;
- a second magnet oriented parallel to the first magnet, the second magnet having a north pole facing down and a south pole facing up, the second magnet having a second stepped portion facing up, the first and second stepped portions forming a recessed area;
- a movable platform having a conductive coil nominally oriented in a platform plane above the first and second magnets and within the recessed area; and
- at least one lower field focusing plate of magnetically permeable material positioned in the recessed area beneath the platform plane to focus a resulting magnetic field in the platform plane.

10. The apparatus of claim 9 further comprising at least one upper field focusing plate of magnetically permeable material positioned above the platform plane.

11. The apparatus of claim 9 wherein the at least one lower field focusing plate includes at least one protruding leg to affect a relative angle between a magnetic field and the conductive coil.

12. The apparatus of claim 9 wherein the conductive coil has an outer outline and the at least one lower field focusing plate is shaped to be outside the outer outline of the conductive coil.

13. The apparatus of claim 12 further comprising a magnetically permeable core positioned between the first and second magnets and beneath the movable platform.

14. The apparatus of claim 13 wherein the conductive coil has an inner outline and the magnetically permeable core is oriented beneath, and within the inner outline of, the conductive coil.

* * * * *